United States Patent
Bastide et al.

(10) Patent No.: US 9,607,040 B2
(45) Date of Patent: *Mar. 28, 2017

(54) TAG MANAGEMENT IN A TAG CLOUD

(71) Applicant: INTERNATIONAL BUSINESS MACHINES CORPORATION, Armonk, NY (US)

(72) Inventors: Paul Roger Bastide, Boxford, MA (US); Matthew E. Broomhall, Goffstown, NH (US); Robert Edward Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 452 days.

This patent is subject to a terminal disclaimer.

(21) Appl. No.: 14/161,856

(22) Filed: Jan. 23, 2014

(65) Prior Publication Data
US 2015/0205829 A1 Jul. 23, 2015

(51) Int. Cl.
G06F 17/30 (2006.01)

(52) U.S. Cl.
CPC .... G06F 17/30386 (2013.01); G06F 17/3053 (2013.01); G06F 17/30345 (2013.01); G06F 17/30595 (2013.01); G06F 17/30864 (2013.01); G06F 17/30997 (2013.01)

(58) Field of Classification Search
CPC ......... G06F 17/30595; G06F 17/30345; G06F 17/3053; G06F 17/30867; G06F 17/281; G06F 17/30386; G06F 17/30997; G06F 17/30864; G06Q 50/01
See application file for complete search history.

(56) References Cited

U.S. PATENT DOCUMENTS

| | | | | |
|---|---|---|---|---|
| 8,037,066 B2 * | 10/2011 | Majko | ............... | G06F 17/30554 707/734 |
| 8,065,601 B2 | 11/2011 | Anderson | | |
| 8,209,337 B2 * | 6/2012 | Park | .................. | G06F 17/30722 707/688 |

(Continued)

OTHER PUBLICATIONS

"Tag Cloud," Wikipedia, downloaded from <http://en.wikipedia.org/wiki/Tag_clouds> on Apr. 23, 2014, pp. 1-7.

(Continued)

*Primary Examiner* — Robert Beausoliel, Jr.
*Assistant Examiner* — Susan F Rayyan
(74) *Attorney, Agent, or Firm* — Charles L. Moore; Moore & Van Allen PLLC

(57) ABSTRACT

A method for managing tags in a tag cloud may include receiving a tag for an object and comparing the tag to existing tags for the object. The comparing may include determining if there is a relationship between the tag and any of the existing tags. The method may also include adding the tag to the tag cloud in response to there being no relationship between the tag and any of the existing tags. The method may additionally include selecting one tag of the existing tags in response to the tag and the one tag being related tags. The method may further include presenting the related tags in the tag cloud. Presenting the related tags in the tag cloud may include at least one of modifying the one tag in the tag cloud, indicating the tags are related, and combining the related tags into a single tag.

14 Claims, 7 Drawing Sheets

(56) References Cited

U.S. PATENT DOCUMENTS

| | | | | |
|---|---|---|---|---|
| 8,224,851 B2* | 7/2012 | Banda | ............... | G06F 17/30997 707/781 |
| 8,266,140 B2* | 9/2012 | Bourges-Waldegg | | G06F 17/30864 707/722 |
| 8,577,888 B2* | 11/2013 | Portilla | ............... | H04L 12/5885 707/738 |
| 8,769,037 B2* | 7/2014 | Bostick | ............ | G06F 17/30911 709/203 |
| 9,021,118 B2* | 4/2015 | John | ..................... | G06F 17/214 709/231 |
| 9,141,694 B2* | 9/2015 | Lamere | ............ | G06F 17/30749 |
| 9,424,369 B2* | 8/2016 | Haddorp | ........... | G06F 17/30867 |
| 2007/0078832 A1* | 4/2007 | Ott | ..................... | G06F 17/30867 |
| 2008/0016071 A1* | 1/2008 | Frieden | ............ | G06F 17/30867 |
| 2008/0046343 A1* | 2/2008 | Maguire | ............ | G06F 17/3071 705/26.62 |
| 2008/0059897 A1* | 3/2008 | Dilorenzo | ......... | G06F 17/30719 715/764 |
| 2008/0071929 A1* | 3/2008 | Motte | ................ | G06F 17/3089 709/246 |
| 2008/0072145 A1* | 3/2008 | Blanchard | ............... | G06F 17/22 715/273 |
| 2008/0114644 A1 | 5/2008 | Frank | | |
| 2009/0077025 A1 | 3/2009 | Brooks et al. | | |
| 2009/0094189 A1* | 4/2009 | Stephens | ........... | G06F 17/30864 |
| 2009/0113281 A1* | 4/2009 | Close | ................ | G06F 17/30011 715/205 |
| 2009/0132526 A1* | 5/2009 | Park | .................. | G06F 17/30722 |
| 2009/0158146 A1* | 6/2009 | Curtis | ............... | G06F 17/30997 715/700 |
| 2009/0182727 A1* | 7/2009 | Majko | ............... | G06F 17/30554 |
| 2009/0287674 A1* | 11/2009 | Bouillet | ............ | G06F 17/30884 |
| 2010/0030752 A1* | 2/2010 | Goldentouch | .... | G06F 17/30911 707/797 |
| 2010/0161620 A1 | 6/2010 | Lamere et al. | | |
| 2011/0010414 A1 | 1/2011 | Chakravarthy et al. | | |
| 2011/0295859 A1* | 12/2011 | Friedman | .......... | G06F 17/30734 707/748 |
| 2012/0084657 A1* | 4/2012 | Ranade | ............ | G06F 17/30876 715/733 |
| 2012/0158935 A1* | 6/2012 | Kishimoto | ............. | G06Q 50/01 709/223 |
| 2012/0303637 A1* | 11/2012 | Carmel | ................. | G06F 17/241 707/749 |
| 2013/0173531 A1* | 7/2013 | Rinearson | ......... | G06F 17/30011 707/608 |
| 2013/0179806 A1* | 7/2013 | Bastide | ............. | G06F 17/30867 715/760 |

OTHER PUBLICATIONS

"Case Sensitivity," Wikipedia, downloaded from <http://en.wikipedia.org/wiki/Case-insensitive> on Jan. 3, 2014, pp. 1-2.

* cited by examiner

TAG LOOKUP TABLE 300

| TAG 302 | ID ASSOCIATED OBJECT 306 | COUNT 308 | OVERLAY 310 |
|---|---|---|---|
| start (304a) | WEBSITE 1 | 4 | LINK TO ANOTHER TAG OR POINTER TO ANOTHER TAG |
| a tag (304b) | IMAGE 1 IN WEBSITE 1 | 2 | |
| B TAG (304c) | IMAGE 1 IN WEBSITE 1 | 1 | a tag |
| middle (304d) | WEBSITE 1 | 2 | |
| C tag (304e) | IMAGE 2 WEBSITE 1 | 3 | a tag |
| STOP (304f) | WEBSITE 1 | 1 | |

FIG. 3

| TAG | TAG CREATION DATE | TAG CREATOR ID | OTHER CHARACTERISTIC |
|---|---|---|---|
| start | 05/24/2013 | JANE | |
| a tag | 06/07/2013 | BILL | |
| B TAG | 07/09/2013 | SAM | |
| middle | 07/20/2013 | BILL | |
| C tag | 08/25/2013 | JANE | |
| STOP | 12/15/2013 | BILL | |

TAG HISTORY TABLE 400
402 TAG
406 TAG CREATION DATE
408 TAG CREATOR ID
410 OTHER CHARACTERISTIC
404a–404f

FIG. 4

TAG MANAGEMENT IN A TAG CLOUD

BACKGROUND

Aspects of the present invention relate to tag clouds, and more particularly to a method, system and computer program product for managing tags in a tag cloud.

Tag clouds have become a common collaborative instrument to capture metadata about an object, such as for example, a news article, webpage, multimedia presentation or similar items. A tag cloud is a visual representation for text data. A tag cloud may be a visually representation of user-generated tags. Tag clouds may be used to describe the content of a website. The tags are usually single words and are normally listed alphabetically. An importance of the tag or popularity may be illustrated by a font size of the tag and/or color of the tag. This formatting is useful for quickly perceiving the most prominent terms and for locating a term to determine its relative prominence. When used as website navigation aids, the tags may be hyperlinked to items or objects associated with the tag. Tag clouds, however, are ineffective in capturing the changing nature of an object or objects within a website or webpage. FIG. 1 is an example of a prior art tag cloud 100 in which a group of users have tagged a webpage (not shown in FIG. 1). User A may tag an element or object in the website as "start". User B may also tag the element or object in the website "start". Accordingly, the tag "start" is depicted in the tag cloud 100 with a larger size or more prominently than other tags with a lower frequency of use or application to the webpage. As time passes, the nature of the webpage changes. However, the tag cloud remains the same. If a user C tags the element "STOP", other viewers may not recognize the "STOP" tag as the more relevant or more important tag because of the weight or size of the "STOP" tag relative to the "start" tag. Thus, there is a need to manage tags within a tag cloud as conditions or the webpage changes.

BRIEF SUMMARY

According to one aspect of the present invention, a method for managing tags in a tag cloud may include receiving a tag for an object and comparing the tag to existing tags for the object. The comparing may include determining if there is a relationship between the tag and any of the existing tags. The method may also include adding the tag to the tag cloud in response to there being no relationship between the tag and any of the existing tags. The method may additionally include selecting one tag of the existing tags in response to the tag and the one tag being related tags. The method may further include presenting the related tags in the tag cloud. Presenting the related tags in the tag cloud may include at least one of modifying the one tag in the tag cloud, indicating the tags are related, and combining the related tags into a single tag.

According to another aspect of the present invention, a system for managing tags in a tag cloud may include a processor and a tag cloud management module operating on the processor. The tag cloud management module may be configured to perform a set of functions. The set of functions may include receiving a tag for an object and comparing the tag to existing tags for the object. The comparing may include determining if there is a relationship between the tag and any of the existing tags. The set of functions may also include adding the tag to the tag cloud in response to there being no relationship between the tag and any of the existing tags. The set of functions may additionally include selecting one tag of the existing tags in response to the tag and the one tag selected from the existing tags being related tags and presenting the related tags in the tag cloud. Presenting the related tags in the tag cloud may include at least one of modifying the one tag in the tag cloud, indicating the tags are related, and combining the related tags into a single tag.

According to a further aspect of the present invention, a computer program product for managing tags in a tag cloud includes a computer readable storage medium having program instructions embodied therewith. The program instructions are executable by a device to cause the device to perform a method that may include receiving a tag for an object. The method may also include comparing the tag to existing tags for the object. The comparing may include determining if there is a relationship between the tag and any of the existing tags. The method may additionally include adding the tag to the tag cloud in response to there being no relationship between the tag and any of the existing tags. The method may further include selecting one tag of the existing tags in response to the tag and the one tag being related tags and presenting the related tags in the tag cloud. Presenting the related tags in the tag cloud may include at least one of modifying the one tag in the tag cloud, indicating the tags are related, and combining the related tags into a single tag.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 3 is an example of a tag lookup table in accordance with an embodiment of the present invention.

FIG. 4 is an example of a tag history table in accordance with an embodiment of the present invention.

DETAILED DESCRIPTION

Figure 1:
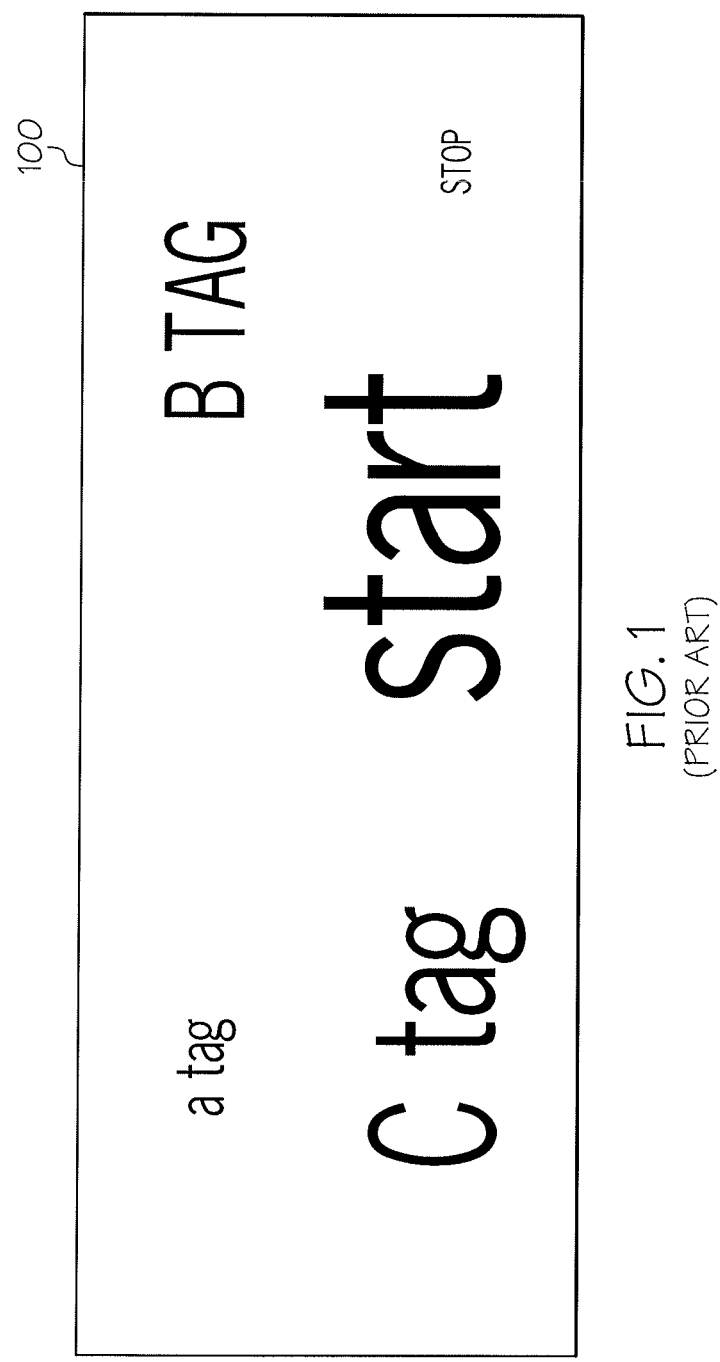
FIG. 1 is an example of a prior art tag cloud without tag management.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disc (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission medium (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 2A:
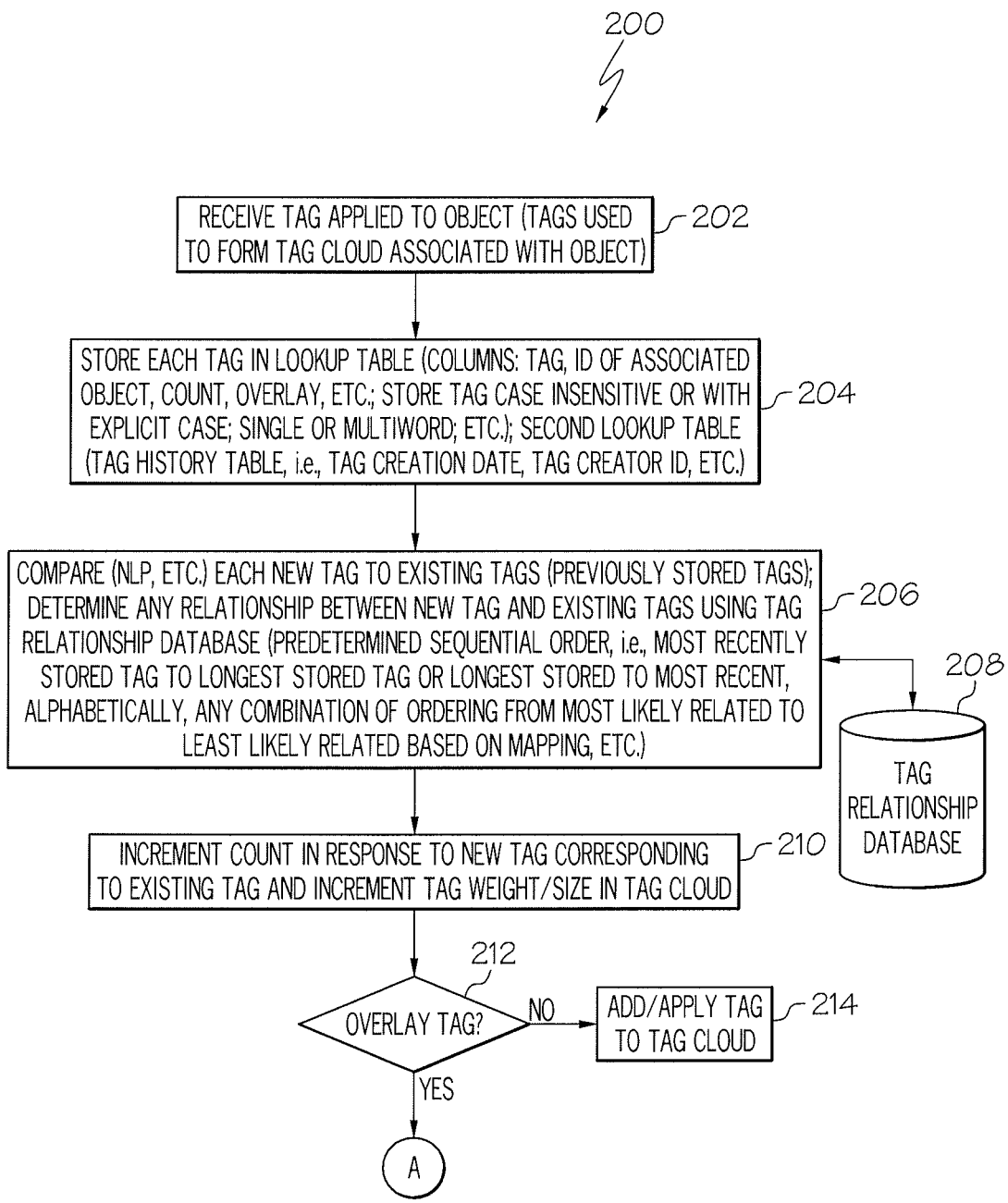
FIGS. 2A and 2B are a flow chart of an example of a method for managing tags in a tag cloud in accordance with an embodiment of the present invention.
Figure 2B:
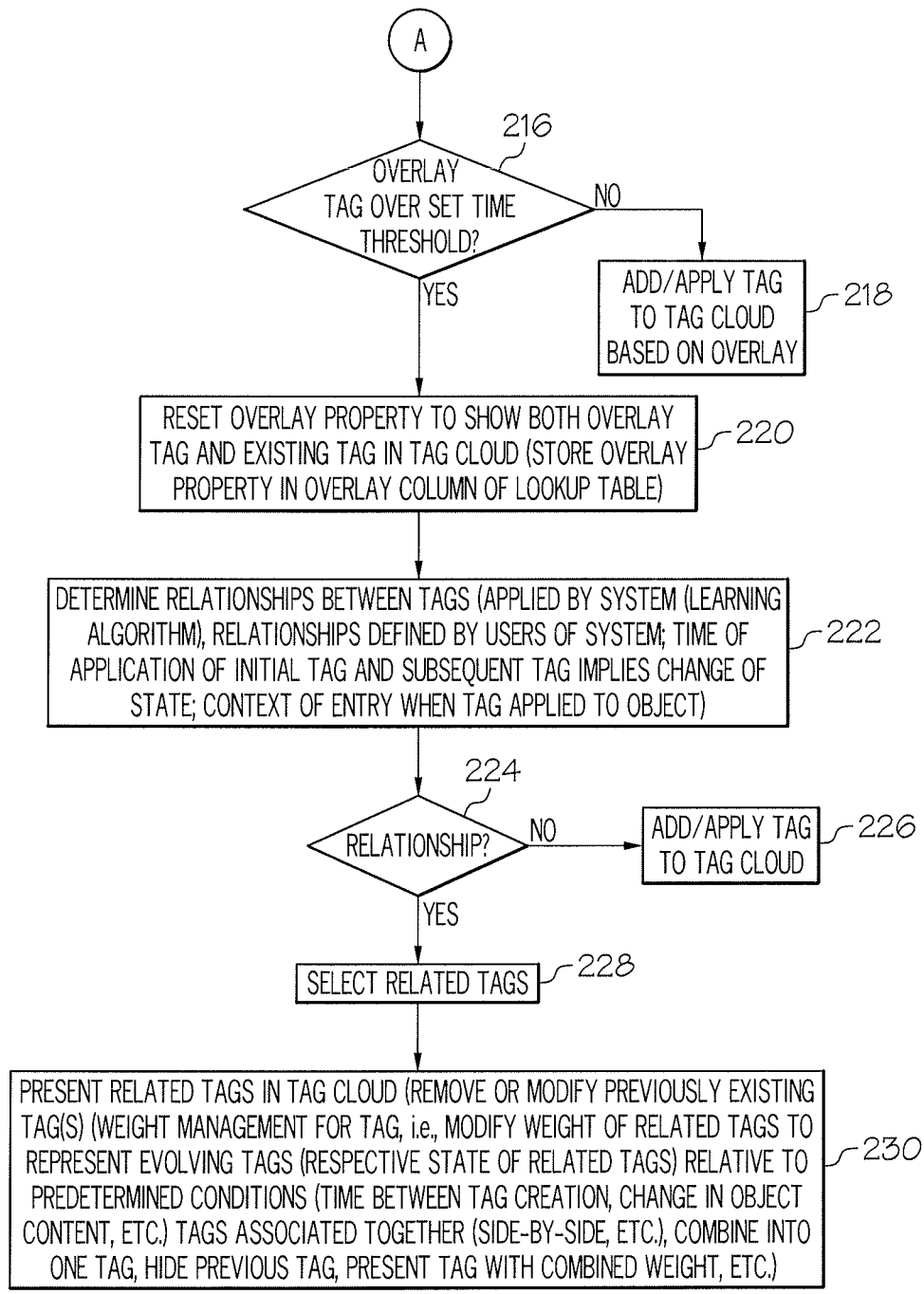

FIGS. 2A and 2B are a flow chart of an example of a method 200 for managing tags in a tag cloud in accordance with an embodiment of the present invention. In block 202, a tag for an object or associated with an object may be received. Examples of an object may include, but are not necessarily limited to, any content on a webpage, such as a news article, an image, a multimedia presentation or other content. A multiplicity of tags may be received over time that may be used to form a tag cloud associated with the object.

In block 204, each tag may be stored in a tag lookup table. Referring also to FIG. 3, FIG. 3 is an example of a tag lookup table 300 in accordance with an embodiment of the present invention. The tag lookup table 300 may include a "TAG" column 302 for storing an actual tag in each row 304a-304f; an "ID ASSOCIATED OBJECT" column 306 for storing an identification of the object associated with the tag; a "COUNT" column 308 for storing a count or a number of times the tag associated with the row 304a-304f has been applied to the object; and an "OVERLAY" column 310 for storing a link or pointer to another tag similar to that described in more detail herein. The tags may be stored in the TAG column 302 either case insensitive (without regard to any particular capitalization), or may be stored with an explicit case or capitalization that may be the same as that actually applied to the object and presented in the tag cloud. In the exemplary tag lookup table 300 in FIG. 3, the tags are stored in the explicit case as that applied to the object and as represented in the exemplary tag clouds 500a and 500b in FIGS. 5A and 5B which correspond to the exemplary tag lookup table 300. The tags may also be single words or multiple words.

In block 204, a tag history table may be provided for storing a tag creation date and an identification of the creator of the tag. FIG. 4 is an example of a tag history table 400 in accordance with an embodiment of the present invention. The tag history table 400 may include a "TAG" column 402 for storing the actual tag in each row 404a-404f; a "TAG CREATION DATE" column 406 to store a creation date of the corresponding tag; a "TAG CREATOR ID" column 408 to store an identification of the creator of the corresponding tag. The tag history table 400 may additionally include an "OTHER CHARACTERISTIC" column 410 that may be used to store some other characteristic associated with the corresponding tag that may be usable in determining if there is a relationship between a new tag, that is received by the system, and any of the existing tags stored in the tag lookup table.

In accordance with an embodiment of the invention, the tag lookup table 300 and the tag history table 400 may be combined in a single tag lookup table.

Referring back to FIG. 2A, in block 206, each new tag that is received may be compared to the existing tags that were previously received and stored in the tag lookup table. The new tag may be compared to the existing tags by using natural language processing (NLP) or a similar algorithm for comparing text. Comparing the new tag to the existing tags may also include determining if there is any relationship between the new tag and any of the existing tags. For example, the new tag may be compared to the existing tags to determine if the new tag is identical to any of the existing tags; the new tag is similar to any of the existing tags; the new tag is synonymous to any of the existing tags; the new tag is an antonym to any of the existing tags; or any other relationship or correspondence that may exist between the new tag and any of the existing tags. Determining other relationships that may exist between the new tag and any of the existing tags may be performed in block 222 as described below. Blocks 210-228 may be considered part of the comparing procedure. A tag relationship database 208 may be used to determine any relationships between the new tag and any of the existing tags.

The new tag may be compared to the existing tags in a predetermined sequential order. For example, the new tag may be compared to the existing tags starting with the most recently stored tag and progressing to the longest stored tag or from the longest stored tag to the most recently stored tag. The new tag may be compared to the existing tags alphabetically or in any combination of ordering from the tags being most likely related to least likely being related based on a mapping which may be defined by a user or users, defined by tag history, statistical analysis or any other mechanism for determining whether the new tag is related to the existing tags.

In block 210, a count associated with the tag may be incremented in the tag lookup table in response to the new tag being the same or corresponding to one of the existing tags. The count may correspond to the number of times the particular tag has been applied to the object or associated with the object by users. A tag weight or size may also be incremented or increased in the tag cloud corresponding to the count.

In block 212, a determination may be made if the new tag is an overlay tag. Similar to that previously described if the new tag is an overlay tag the new tag is linked to another tag or includes a pointer to another tag. An overlay tag may be defined as a tag that has a relationship or relationship bond between two or more tags. For example, the tags "Notes Tutorial draft" and "Notes Tutorial final" include overlay tags "draft" and "final" for "Notes Tutorial". If the new tag is not an overlay tag and there is no relationship between the new tag and any of the existing tags, the new tag is added or applied to the tag cloud in block 214 and stored in the tag lookup table for comparison with future new tags that are received.

If the new tag is an overlay tag in block 212, the method 200 may advance to block 216. In block 216, a determination may be made if the overlay tag is over a set time threshold. For example, is the tag intended to exist for only a selected period of time, i.e., one day, one week, one month, or some other selected time period. If the overlay tag is not set for a time threshold, the overlay tag may be applied or added to the tag cloud based on the overlay in block 218.

If the overlay tag is set for a particular time threshold, the method 200 may advance to block 220. In block 220, the overlay property may be reset to show both the overlay tag and the related existing tag in the tag cloud based on the time threshold or time period set for the tags to appear in the tag cloud. The overlay property or time threshold may also be stored in the overlay column 310 of the tag lookup table 300.

In block 222, a relationship between the tag and any of the existing tags may be determined. Relationships between the tag and any of the existing tags may be determined in various ways. A relationship between the tags may be determined by the system using a learning algorithm. Examples of learning algorithms that may be used may include, but is not necessarily limited to, the C4.5 algorithm and natural language parsers. Relationships between tags may be defined by users of the system. A time of application of an initial tag and a subsequently received tag for the object may imply a change of state. The relationship may also be defined by a context of entry when the tag is applied to the object. Similar to that previously described, a tag relationship database 208 may also be used to determine relationships between the tag and the existing tags. The tag relationship database 208 may be preloaded using a custom curated mapping. A custom curated mapping is a mapping that is managed (curated) and customized to map tag terms together. For example, two or more tags may be mapped together when there is some relationship between the two or more terms, such as a company may change the name or other identification associated with a product and the two names or identities may be mapped together in the tag relational database 208. Examples of related tags that may also be stored in the tag relationship database 208 may include, but is not necessarily limited to, "start-stop", "beginner-intermediate-advanced", "beginning-middle-end", "start-finish", "left-right", "up-down", and similar relationships. The relationships may be formed using antonyms and may be further optimized using synonyms. The relationships may be unidirectional, i.e., advancing in the same direction, bidirectional or multidirectional, i.e., proceeding in two or more directions, or looped, i.e., recurring, such as begin day, middle of day, end of day, where the end of day loops back to the beginning of day. The looped relationship may be applicable to any time frame or any process or procedure that is repeatable or repeats.

The relationships may be categorized. The categories may be applied to specific object identifications (IDs) or limited to specific objects. A category may apply to a related group of items or objects, such as for example a specific group of products or other items.

In block 224, a determination may be made if there is any relationship between the tag and the existing tags from block 222. If there is no relationship the tag is added or applied to the tag cloud in block 226.

If there is a relationship between the tag and one of the existing tags in block 224, the method 200 may advance to block 228. In block 228, the one tag of the existing tags is selected in response to the tag and the one tag being related tags.

In block 230, the related tags may be presented in the tag cloud. Examples of presenting the related tags in the tag cloud may include, but is not necessarily limited to, removing or modifying the previously existing tag, managing the weight or size of the tags, the related tags may be associated with one another in a predetermined arrangement (positioning side-by side or some other arrangement), combining the related tags into one tag, hiding the previous tag, presenting the related tags with a combined weight or some other arrangement for presenting the related tags in the tag cloud.

An example of presenting the related tags in the tag cloud by managing the weight or size of the related tags may include setting a weight or size of the new tag and modifying a weight or size of the previously existing tag to represent a respective state of the related tags relative to a predetermined condition. The predetermined condition may include, but is not necessarily limited to, a time duration between creation of the respective related tags, a change associated with the object, such as a change in content of the object, a change in importance of the object relative to one or more users, a change in existence of the object, or other change associated with the object or webpage containing the object.

Figure 5A:
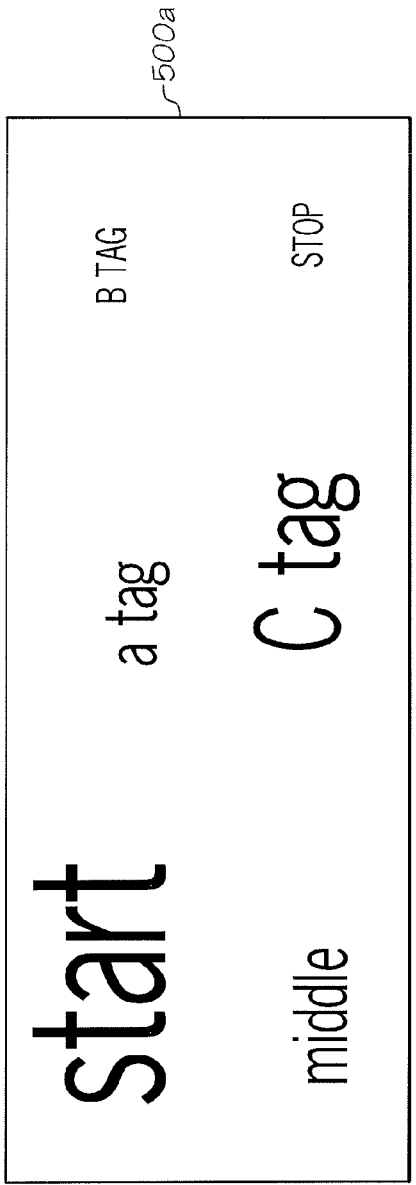
FIG. 5A is an example of a tag cloud before applying tag management in accordance with an embodiment of the present invention.
Figure 5B:
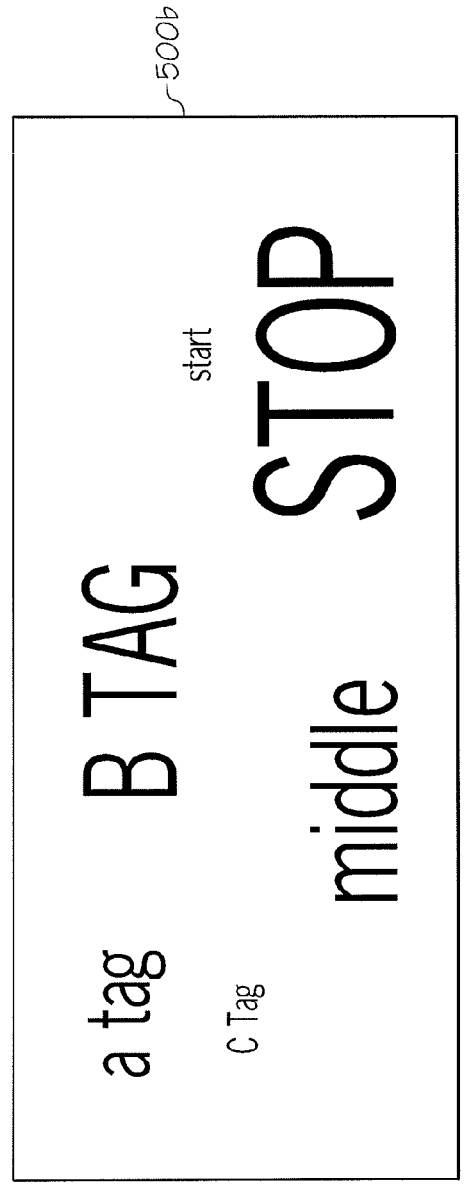
FIG. 5B is an example of a tag cloud resulting from managing the tags in accordance with an embodiment of the present invention.

FIG. 5A is an example of a tag cloud 500a before applying tag management in accordance with an embodiment of the present invention, and FIG. 5B is an example of the tag cloud 500b resulting from managing the tags in accordance with an embodiment of the present invention. The tag clouds 500a and 500b correspond to the exemplary tag lookup table 300 in FIG. 3 and tag history table 400 in FIG. 4. In the tag cloud 500a, the tag "start" (row 304a, TAG column 302 in FIG. 3) is applied to the object (Website 1) by Jane and added to the tag cloud 500a on May 24, 2013 (row 404a in FIG. 4) and has a count of 4 (row 304a, COUNT column 308 in FIG. 3). Bill creates and applies the tag "STOP" to the object (Website 1) on Dec. 15, 2014 (row 404f, TAG column 402 in FIG. 4). The "STOP" tag has a count of 1 (row 304f, COUNT column 308 in FIG. 3). Accordingly, the weight of the tag "STOP" is much less that the tag "start" and is shown as being much smaller in tag cloud 500a without the tag management of the present invention. Because of the reduced weight or size, users may not notice the "STOP" tag relative to other tags in the unmanaged tag cloud 500a in FIG. 5A.

However, the "STOP" tag is later in time and most likely more pertinent to the users of the tag cloud 500a. Therefore, in tag cloud 500b resulting from managing the tags as described herein, the weight or size of the "STOP" tag may be set to be presented at a selected weight or size relative to the "start" tag because of the "STOP" tag's more recent time of creation and relative pertinence or importance. The weight or size of the "start" tag may be modified to represent the respective states of the two related tags based on the predetermined condition of the respective times of creation and relative importance of the related tags to users of the tag cloud.

The "start", "middle" and "STOP" tags may also be determined to be related tags by using the method 200 and may be arranged proximate one another or side-by-side as shown in the exemplary tag cloud 500b in FIG. 5B in which tag management in accordance with an embodiment of the present invention has been applied. Similarly, the tags "a tag", "B TAG", and "C tag" may also be determined to be related tags and may be arranged proximate one another as also shown in the tag cloud 500b in FIG. 5B resulting from managing the tags as described herein. Accordingly, presenting the related tags by managing the tags as described herein may include setting a weight of the new tag and modifying the weight of the related existing tag to represent the respective states of the related tags relative to a predetermined condition. The predetermined condition may include, but is not necessarily limited to, a time duration between creation of the related tags, a change associated with the object, such as a change in content of the object, deletion of the object, change in pertinence or importance of the object to users (change in context), a change in a threshold value associated with the object (whether the value is predetermined or dynamically created or updated), or other changes associated with the object or website.

Figure 6:
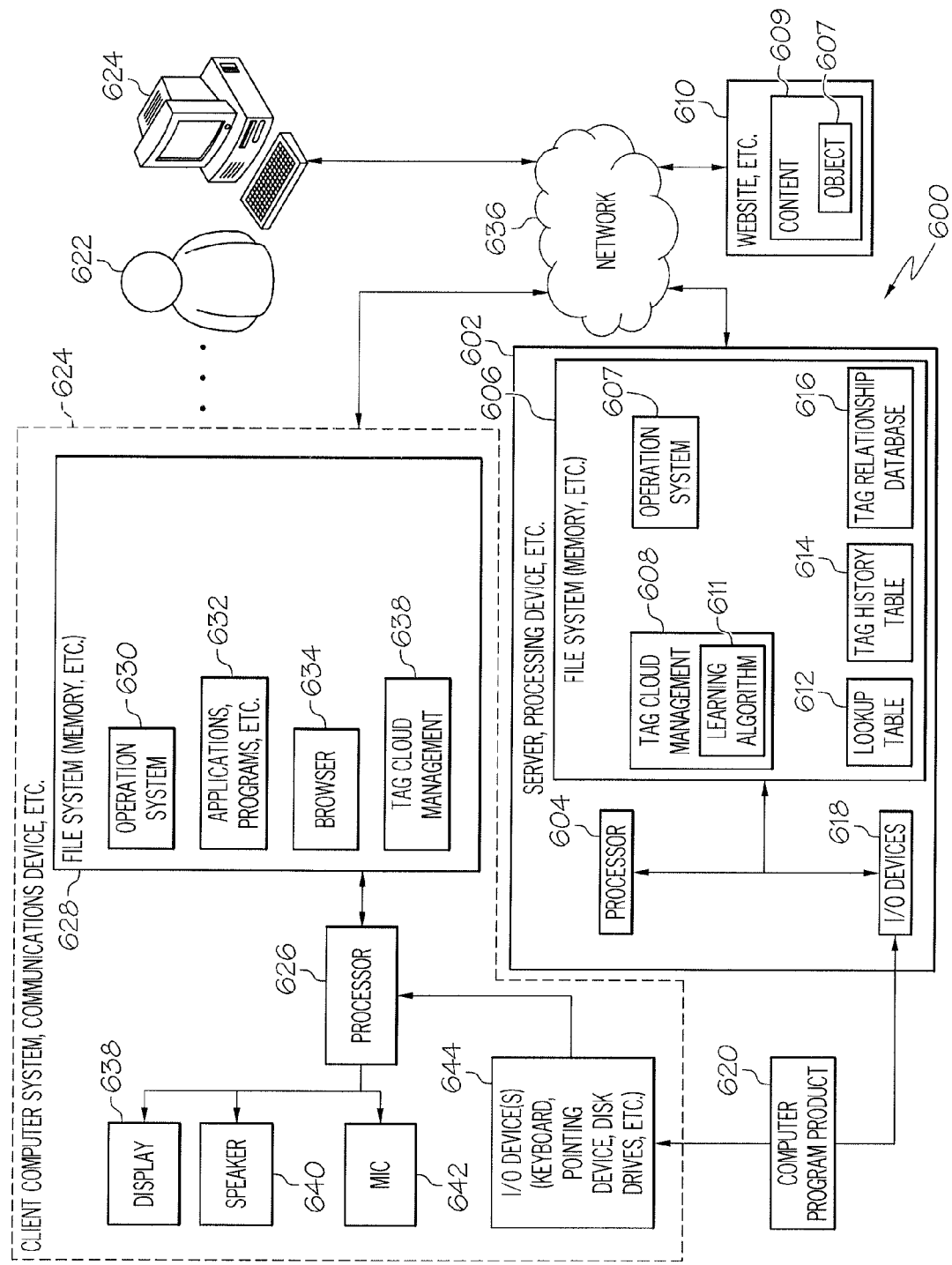
FIG. 6 is a block schematic diagram of an example of a system for managing tags in a tag cloud in accordance with an embodiment of the present invention.

FIG. 6 is a block schematic diagram of an example of a system 600 for managing tags in a tag cloud in accordance with an embodiment of the present invention. The method 200 of FIGS. 2A and 2B may be embodied in or performed by the system 600. The system 600 may include a processing device 602. The processing device 602 may be a server or similar processing device. The processing device 602 may include a processor 604 for controlling operation of the processing device 602 and for performing functions, such as those described herein with respect to managing tags in tag clouds. The processing device 602 may also include a file system 606 or memory. An operating system 607, applications and other programs may be stored on the file system 606 for running or operating on the processor 604. A tag cloud management module 608 or system may also be stored on the file system 606 and may be compiled and run on the processor 604 to perform the functions for managing tags on tag clouds similar to that described herein. The method 200 of FIGS. 2A and 2B may be embodied in the tag cloud management module 608 and performed by the processor 604 when the tag cloud management module 608 is compiled and run on the processor 604. As previously described, the tags on a tag cloud may have been applied by a user to an object 607 that may be within the content 609 on a website 610 or webpage.

The tag cloud management module 608 may include a learning algorithm 611. Similar to that previously discussed, the learning algorithm 611 may be configured to determine or learn relationships between tags in a tag cloud.

A tag lookup table 612, tag history table 614 and tag relationship database 616 may also be stored on the file system 606 of the processing device 602. The tag lookup table 614 may be similar to the exemplary tag lookup table 300 described with reference to FIG. 3. The tag history table 614 may be similar to the exemplary tag history table 400 described with reference to FIG. 4, and the tag relationship database 616 may be similar to the tag relationship database 208 described with reference to FIG. 2A.

The processing device 602 may also include one or more input devices, output devices or combination input/output devices, collectively I/O devices 618 in FIG. 6. The I/O devices 618 may include, but are not necessarily limited to, a keyboard or keypad, pointing device, such as a mouse, disk drive and any other devices to permit a user to interface with and control operation of the processing device 602 and to access the tag cloud management module 608 or system. At least one of the I/O devices 618 may be a device to read a computer program product, such as computer program product 620. The computer program product 620 may be similar to those described in more detail herein. The tag cloud management module 608 may be loaded on the file system 606 from a computer program product, such as computer program product 620. The tag relationship database 616 may also be preload on the file system 606 from a computer program product.

A user 622 of the system 600 for managing tags in a tag cloud may use a computer system 624 or communications device to access the processing device 602 or server and tag cloud management module 608 or system for managing tags in a tag cloud. The computer system 624 or communications device may be any sort of communications device including a mobile or handheld computer or communications device. The computer system 624 may include a processor 626 to control operation of the computer system 624 and a file system 628, memory or similar data storage device. An operating system 630, applications 632 and other programs may be stored on the file system 628 for running or operating on the processor 626. A web or Internet browser 634 may also be stored on the file system 628 for accessing the processing device 602 or server via a network 636. The network 636 may be the Internet, an intranet or other private or proprietary network.

In accordance with an embodiment, a tag cloud management application 638 or feature may also be stored on the file system 628 and operate on the processor the 626 of the user's computer system 624. The tag cloud management application 638 operating on the computer system 626 may interface with or operate in conjunction with the tag cloud management module or system 608 to perform the functions and operations described herein for managing tags on a tag cloud. Accordingly, tag cloud management application 638 operating on the computer system 624 may perform some of the functions and operations of the method 200 and tag cloud management module 608 operating on the server 602 may perform other functions of the method 200.

The computer system 624 may also include a display 638, a speaker system 640, and a microphone 642 for voice communications. The computer system 624 may also include one or more input devices, output devices or combination input/output devices, collectively I/O devices 644. The I/O devices 644 may include a keyboard or keypad, pointing device, such as a mouse, disk drives and any other devices to permit a user, such as user 622, to interface with and control operation of the computer system 624 and to access the tag cloud management application 638 and tag cloud management system 608 on server 602. The I/O devices 644 may also include at least one device configured to read computer code from a computer program product, such as computer program product 620.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or carry out combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A system for managing tags in a tag cloud, comprising:
a processor;
a tag cloud management module operating on the processor, the tag cloud management module being configured to perform a set of functions comprising:
receiving a new tag for an object;
comparing the new tag to existing tags for the object, wherein the comparing comprises determining if there is a relationship between the new tag and any of the existing tags;
determining that the new tag is related to an existing tag for the object, wherein the existing tag comprises a count greater than a count of the new tag, the count of the existing tag corresponding to a number of times the existing tag has been associated with the object;
presenting on a display the new tag and the existing tag for the object in the tag cloud, wherein the existing tag comprises a size greater than a size of the new tag on the display in response to the count or importance of the existing tag being greater than the count or importance of the new tag; and
applying tag management to the tag cloud, wherein applying tag management comprises modifying the size of at least one of the existing tag and the new tag on the display in response to a particular condition associated with the new tag or the object such that the size of the new tag is greater than the size of the existing tag in the tag cloud on the display even though the count or importance of the existing tag is greater than the count or importance of the new tag.

2. The system of claim 1, further comprising a file system, the file system comprising a tag lookup table, wherein the new tag and the existing tags are stored in the tag lookup table and wherein comparing the new tag to the existing tags comprises comparing the new tag to the existing tags in the tag lookup table.

3. The system of claim 2, wherein the file system further comprises a tag relationship database, the tag relationship database comprising a plurality of sets of tags, the tags in each set of tags having a relationships with one another.

4. The system of claim 2, wherein the tag lookup table comprises a tag column for storing each tag, a column for storing an identification of the object associated with each tag, a column for storing the count of each tag, and an overlay column for a link or pointer to another tag.

5. The system of claim 2, wherein the file system further comprises a tag history table, wherein the tag history table comprises a column for storing a tag creation date associated with each tag and a column for storing a tag creator identification associated with each tag.

6. The system of claim 1, wherein the tag cloud management module is further configured for performing the function comprising presenting the new tag and the existing tag by setting a weight of the new tag and modifying a weight of the existing tag to represent a respective state of the new tag and the existing tag relative to a predetermined condition, wherein the predetermine condition comprises one of a time between creation of the new tag and the existing tag and a change in content of the object.

7. The system of claim 1, wherein applying tag management to the tag cloud further comprises moving either the new tag or the one existing tag next to each other in the tag cloud.

8. The system of claim 1, wherein the particular condition comprises a time duration between creation of the existing tag and the new tag.

9. The system of claim 1, wherein the particular condition comprises a change in content of the object.

10. The system of claim 1, wherein the particular condition comprises a change in importance or pertinence of the object or a change in value of the object.

11. The system of claim 1, wherein the particular condition comprises the object no longer existing.

12. A computer program product for managing tags in a tag cloud, the computer program product comprising a computer readable storage medium having program instructions embodied therewith, the program instructions executable by a device to cause the device to perform a method comprising:
    receiving, by the device, a new tag for an object;
    comparing, by the device, the new tag to existing tags for the object, wherein the comparing comprises determining if there is a relationship between the new tag and any of the existing tags;
    determining, by the device, that the new tag is related to an existing tag for the object, wherein the existing tag comprises a count greater than a count of the new tag, the count of the existing tag corresponding to a number of times the existing tag has been associated with the object;
    presenting on a display, by the device, the new tag and the existing tag for the object in the tag cloud, wherein the existing tag comprises a size greater than a size of the new tag on the display in response to the count of the existing tag being greater than the count of the new tag; and
    applying tag management, by the device, to the tag cloud, wherein applying tag management comprises modifying the size of at least one of the existing tag and the new tag on the display in response to a particular condition associated with the new tag or the object such that the size of the new tag is greater than the size of the existing tag in the tag cloud on the display even though the count or importance of the existing tag is greater than the count or importance of the new tag.

13. The computer program product of claim 12, wherein the method further comprises storing the new tag in a tag lookup table and wherein comparing comprises comparing the new tag to the existing tags stored in the tag lookup table.

14. The computer program product of claim 12, wherein the method further comprises setting a weight of the new tag and modifying a weight of the existing tag to represent a respective state of the new tag and the existing relative to a predetermined condition.

* * * * *